Nov. 14, 1939.  J. FIEUX  2,180,043

GYROSCOPE

Filed Sept. 30, 1938

Inventor

Jean Fieux

By Cameron, Kerkam & Sutton.
Attorneys

Patented Nov. 14, 1939

2,180,043

UNITED STATES PATENT OFFICE 2,180,043

GYROSCOPE

Jean Fieux, Paris, France, assignor of one-half to Schneider & Cie, Paris, France, a joint-stock company of France Application September 30, 1938, Serial No. 232,692
In France October 19, 1937

9 Claims. (Cl. 74—5)

It is known that for a gyroscope to be capable of acting as a precision tachometer, it is indispensable that the velocity of spin of the rotating mass should be constant, or at least very substantially constant.

It is also known that, irrespective of the method of driving employed for setting in rotation the rotating mass referred to, it is practically impossible, by merely regulating the speed of rotation of the driving member, to obtain the constancy of the velocity of spin above referred to.

An appreciable progress has already been secured in the desired direction by the construction of friction gyroscopes in the manner described in our United States Letters Patent No. 2,124,817.

The method of driving employed in these gyroscopes does indeed render the velocity of spin of the rotating mass practically independent of the variations in the speed of rotation of the driving member.

Nevertheless, in friction gyroscopes of the kind referred to, the velocity of spin of the rotating mass may, owing to various causes, still be subject to variations capable of being troublesome, particularly when such gyroscopes are employed as precision tachometers.

Among the causes of variation referred to, it is necessary to note in the first place those dependent upon a variation in the mechanical conditions of the apparatus, wear of the wipers, wear of the bearings, weakening of the springs acting on the wipers and so forth, a variation which is generally slow but nevertheless appreciable.

In addition, in the case where the apparatus is required to function in atmospheres differing more particularly from the point of view of their density (in the case of different barometric pressures, for example), the variation in the passive resistances following upon a variation in the resistance of the air and in its friction against the revolving mass, necessarily results in a variation in the velocity of spin of the latter.

This latter variation may, however, be much more troublesome in certain cases than the preceding variation, in view of the fact that its fluctuations are much less slow, if not very rapid, and are less easy to foresee.

The present invention relates to a friction gyroscope comprising:

On the one hand, a friction compensation device forming an adjustable brake adapted to permit, by suitable periodical adjustments, the elimination of the first of the two hereinbefore mentioned causes of the variation in velocity of the rotating mass, that is to say, the cause constituted by the variations in the mechanical state of the apparatus.

On the other hand, a supplementary device for the automatic compensation of the atmospheric variations, said device being constituted by a second brake, the action whereof is controlled by a manometric capsule, the position of which is furthermore itself adjustable having regard to any adaptations to which it may be desired to subject the said capsule.

Thus improved, the friction gyroscopes referred to are veritably new and well defined industrial products capable of giving the fullest satisfaction, particularly as precision tachometers.

A particular form of construction of the invention is shown by way of example in the accompanying drawing and described in the following description, this form of construction being indicated as applied to a simple tachometer of the type described in our United States Letters Patent No. 2,106,998, but of course the construction referred to may be modified in its constructional details or may be supplemented by any expedient accessory device without departing from the invention, and likewise any other normal application of the improved gyroscope referred to may be considered.

Figure 1:
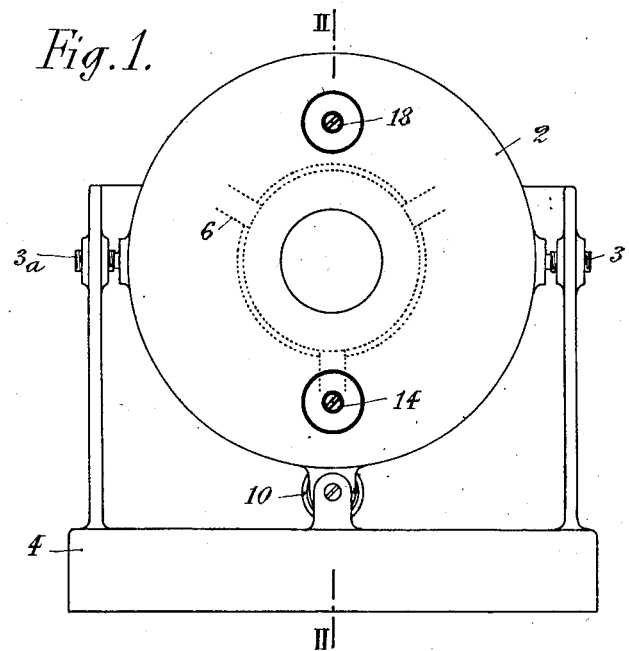
Figure 1 represents an elevation of the device.
Figure 2:
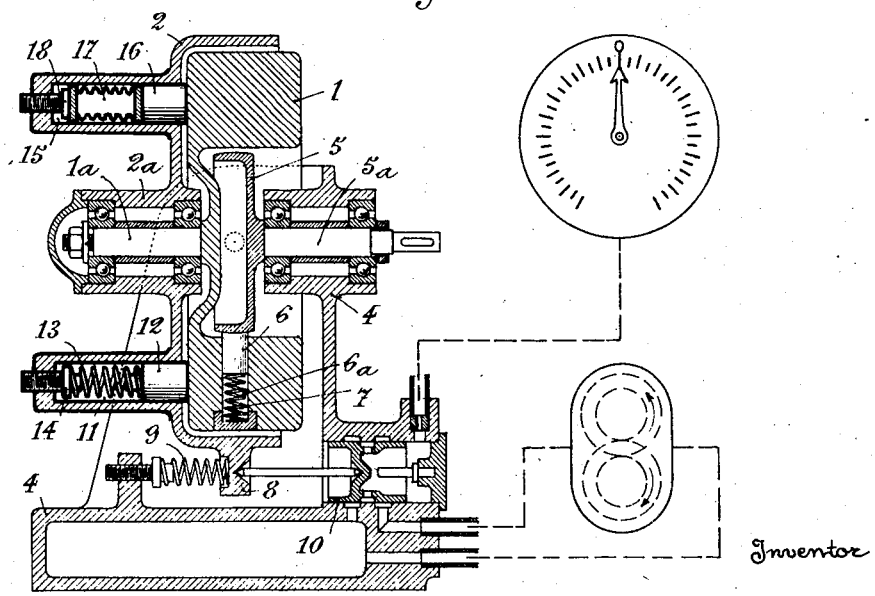
Figure 2 represents a diametrical section along the line II—II of Figure 1.

In these figures, the two supplementary devices characterising the improved gyroscope according to the invention have been drawn in heavier lines.

As will be seen in the drawing, and according to what has already been set forth in the United States Letters Patent No. 2,124,817, the gyroscope comprises a gyroscopic mass 1—1$^a$ journalled along its axis of rotation in a half-casing 2—2$^a$ which is itself suspended by pivots 3—3$^a$ in a frame 4, wherein is also journalled a pulley 5, having a spherical external surface, keyed to a shaft 5$^a$ driven by a motor or by any mechanical transmission, which it has not been considered necessary to show.

In known manner, the gyroscopic mass 1—1$^a$ carries a certain number of wipers 6 disposed in radial cavities 6$^a$ and subjected to the action of thrust spring 7 urging them constantly to maintain contact with the external spherical surface of the pulley 5.

In accordance with what is set forth in the United States Letters Patent No. 2,106,998 and in the case of the application therein described, a boss 8 of the casing 2 is intended to receive the thrust of a spring 9 on one side and the reaction of a piezometric piston 10 on the other.

According to the invention and for the compensations under consideration, the casing 2 of the gyroscope comprises in the first place a first cylindrical cavity 11 serving as guide for a wiper 12 maintained in contact with the rotor 1 by the action of the spring 13 bearing on an adjustable seat 14.

The casing 2 also comprises a second cylindrical cavity 15 serving as guide for a wiper 16 maintained in contact with the rotor 1 by a manometric capsule 17, the other end of which bears against an adjustable stop 18.

With regard to the wiper 12, its compensating function will be readily understood, as its action and the braking effect which it exerts on the rotor may be corrected and adjusted periodically by means of the seat 14 for re-establishing in the desired place, for example on ground level, the normal velocity required for the rotor.

It should be remarked in passing that the tension of the spring 13 should be all the smaller, the greater is the wear of the wipers 6.

With regard to the wiper 16, it is applied to the rotor by the action resulting from the expansion or contraction (according to the case) of the air contained in the capsule 17 at the moment the latter is immersed in an atmosphere of a different pressure, when by hypothesis it has been charged with air at the normal atmospheric pressure. Its action is practically proportional to the difference in pressure, and consequently, very sensibly, to the loss or increase in density of the surrounding air.

As the friction of the air on the rotor is precisely an almost direct function of its density, it will be appreciated that the automatic compensation by the wiper 16 is sufficiently exact to be satisfactory in practice.

It should be remarked that the adjustment by the stop screw 18 is merely intended to eliminate the play on the ground, that is to say when the apparatus is in an atmosphere of normal pressure.

Of course, the two improvements which have just been set forth and described would be capable, if necessary, of application to gyroscopes other than friction gyroscopes, with a view to obtaining in such other gyroscopes compensations of the same order and of the same nature as those hereinbefore considered.

I claim:

1. A gyroscope comprising a compensating braking member applied against the rotating mass with constant pressure by a device adjustable to alter said pressure, and a compensating braking member applied against the rotating mass with variable pressure by a device responsive to changes in atmospheric pressure.

2. A gyroscope as claimed in claim 1, comprising a compensating braking member applied against the rotating mass by a spring the reaction of which is resisted by an adjustable abutment.

3. A gyroscope as claimed in claim 1, comprising a compensating braking member applied against the rotating mass by a manometric capsule.

4. In a gyroscope, a pair of compensating braking members adapted to frictionally contact the rotating mass of the gyroscope, means for urging one of said braking members against said rotating mass with a substantially constant pressure, means for manually adjusting said last named means to vary the magnitude of said pressure, and means responsive to changes in atmospheric pressure for urging the other of said braking members against said rotating mass with a variable pressure.

5. In a gyroscope, a pair of compensating braking members adapted to frictionally contact the rotating mass of the gyroscope, a spring urging one of said braking members against said rotating mass with a substantially constant pressure, means for manually varying the pressure exerted by said spring upon said braking member, and means responsive to changes in atmospheric pressure for urging the other of said braking members against said rotating mass with a variable pressure.

6. In a gyroscope, a pair of compensating braking members adapted to frictionally contact the rotating mass of the gyroscope, means for urging one of said braking members against said rotating mass with a substantially constant pressure, means for manually adjusting said last named means to vary the magnitude of said pressure, and an expansible and contractible element filled with air at normal atmospheric pressure for urging the other of said braking members against said rotating mass with a pressure that automatically varies with changes in atmospheric pressure.

7. In a gyroscope, a pair of compensating braking members adapted to frictionally contact the rotating mass of the gyroscope, a compression spring having one end in engagement with one of said braking members and urging the latter against said rotating mass with a substantially constant pressure, a manually adjustable abutment for the other end of said spring for varying the pressure exerted by the latter upon said braking member, and a manometric capsule for urging the other of said braking members against said rotating mass with a pressure that automatically varies with changes in atmospheric pressure.

8. In a gyroscope, a compensating braking member adapted to frictionally contact the rotating mass of the gyroscope, and means responsive to changes in atmospheric pressure for urging said braking member against said rotating mass with a pressure that varies inversely with changes in the atmospheric pressure.

9. In a gyroscope, a rotable mass, a casing in which said mass is mounted for rotation, a compensating braking member carried by said casing and adapted to frictionally contact said rotating mass, and an element expansible and contractible in response to changes in atmospheric pressure for urging said braking member against said rotating mass with a variable pressure.

JEAN FIEUX.